(12) United States Patent
Huybrechts et al.

(10) Patent No.: US 8,211,970 B2
(45) Date of Patent: Jul. 3, 2012

(54) AQUEOUS PIGMENT DISPERSIONS

(75) Inventors: Jozef Theresia Huybrechts, Turnhout (BE); Paul P. Bruylants, Hever (BE); Alexander K. Sorser, West Bloomfield, MI (US); Michael Koerner, Bloomfield Hills, MI (US)

(73) Assignee: E I du Pont de Nemours and Company, Wilmington, DE (US)

( * ) Notice: Subject to any disclaimer, the term of this patent is extended or adjusted under 35 U.S.C. 154(b) by 365 days.

(21) Appl. No.: 12/527,472

(22) PCT Filed: Feb. 20, 2008

(86) PCT No.: PCT/US2008/002190
§ 371 (c)(1),
(2), (4) Date: Aug. 17, 2009

(87) PCT Pub. No.: WO2008/103356
PCT Pub. Date: Aug. 28, 2008

(65) Prior Publication Data
US 2010/0036045 A1 Feb. 11, 2010

Related U.S. Application Data

(60) Provisional application No. 60/902,732, filed on Feb. 21, 2007.

(51) Int. Cl.
*C08L 51/06* (2006.01)
(52) U.S. Cl. ......... 524/504; 524/530; 524/533; 523/161
(58) Field of Classification Search .................. 523/161; 524/504, 530, 533
See application file for complete search history.

(56) References Cited

U.S. PATENT DOCUMENTS

| | | | | |
|---|---|---|---|---|
| 5,231,131 A * | 7/1993 | Chu et al. | ........................ | 524/504 |
| 5,824,733 A * | 10/1998 | Dobert et al. | .................. | 524/506 |
| 6,232,369 B1 * | 5/2001 | Ma et al. | ........................ | 523/161 |
| 7,193,008 B2 * | 3/2007 | Legrand et al. | ................ | 524/555 |

FOREIGN PATENT DOCUMENTS

JP 63154776 A * 6/1988
WO WO 02081581 A1 * 10/2002

OTHER PUBLICATIONS

JP 63154776 A, Jun. 1988, English Translation.*

* cited by examiner

*Primary Examiner* — Satya Sastri
(74) *Attorney, Agent, or Firm* — Sudhir G. Deshmukh

(57) ABSTRACT

The invention relates to aqueous pigment dispersions comprising at least one dispersed pigment, an aqueous carrier and a copolymer prepared by polymerization of at least one macromonomer (1) having a terminal olefinic unsaturation with a mixture of olefinically unsaturated monomers (2), wherein the macromonomer (1) comprises 1a) 5-100% by weight of at least one polymerized acid functional unsaturated monomer, 1b) optionally at least one polymerized hydroxy functional unsaturated monomer, and optionally 1c) at least one further polymerized olefinically unsaturated monomer, and wherein the mixture of olefinically unsaturated monomers (2) comprises 2a) 5-80% by weight of at least one unsaturated vinyl aromatic monomer, 2b) 5-50% by weight of at least one vinyl monomer with at least one polar heterocyclic group with a 5 or 6 membered ring containing at least one ring nitrogen atom which is not connected to a hydrogen atom, and optionally 2c) other olefinically unsaturated monomers.

13 Claims, No Drawings

AQUEOUS PIGMENT DISPERSIONS

FIELD OF THE INVENTION

The invention relates to aqueous pigment dispersions and to waterborne coating compositions containing these pigment dispersions.

BACKGROUND OF THE INVENTION

Water-dispersable copolymers and their use as pigment dispersant in waterbased coating compositions are well known in the art. For example, U.S. Pat. No. 5,231,131 describes aqueous pigment dispersants based on graft copolymers comprising a hydrophobic polymeric backbone, containing hydrophobic monomers, and side chains of hydrophilic macromonomers. Particularly useful graft copolymers have a backbone of polymerized methylacrylate, butylacrylate, ethylacrylate and optionally acrylic acid or acryl amido methylpropane sulfonic acid.

EP 1 197 537 further discloses aqueous pigment dispersing resins based on graft copolymers comprising macromonomers obtained from methacrylic acid esters and styrene and optionally methacrylic acid and a polymeric backbone based on monomers comprising a monomer with ionic functional groups selected from amino, quarternary ammonium salt and sulfonic acid groups and comprising a monomer having polyoxyalkylene chains.

All those already known pigment dispersants have a common disadvantage. Pigment dispersions based on the already disclosed graft copolymers lead to coatings with insufficient intensity of coloration and in particular insufficient jetness in case of black coatings.

Therefore, it is an object of the present invention to provide pigment dispersions with high wetting properties and dispersing stability which can be used in preparing pigmented coating compositions, in particular coating compositions pigmented with black pigments, which lead to coatings of high color strength and in particular to coatings with high jetness.

SUMMARY OF THE INVENTION

The present invention relates to aqueous pigment dispersions comprising at least one dispersed pigment, an aqueous carrier and at least one copolymer, said copolymer is prepared by copolymerization of 10-90% by weight, preferably 20-80% by weight and most preferred 30-70% by weight of at least one macromonomer (1) having a terminal olefinic unsaturation with 90-10% by weight, preferably 80-20% by weight and most preferred 70-30% by weight of a mixture of olefinically unsaturated monomers (2), wherein the % by weight are based on the total amount of the (meth)acrylic copolymer and add up to 100% by weight, and wherein the macromonomer (1) comprises 1a) 5-100% by weight of at least one polymerized acid functional unsaturated monomer,
1b) optionally at least one polymerized hydroxy functional unsaturated monomer,
1c) and optionally at least one polymerized olefinically unsaturated monomer different from monomers 1a) and 1b), and wherein the mixture of olefinically unsaturated monomers (2) comprises
2a) 5-80% by weight of at least one unsaturated vinyl aromatic monomer,
2b) 5-50% by weight of at least one unsaturated vinyl monomer with at least one polar heterocyclic group with a 5 or 6 membered ring, containing at least one ring nitrogen atom which is not connected to a hydrogen atom,
2c) and optionally at least one olefinically unsaturated monomer different from monomers 2a) and 2b), wherein the % by weight of component 1a) are based on the total amount of macromonomer (1) and the % by weight of components 2a, 2b and 2c are based on the total amount of the mixture of olefinically unsaturated monomers (2) and add up to 100% by weight.

Preferably the copolymer has a weight average molecular weight Mw of 3,000 to 100,000 most preferred of 5,000 to 70,000 an acid number of 20-300 mg KOH/g, most preferred of 30-200 mg KOH/g and a hydroxy number of 0-300 mg KOH/g, most preferred of 20-200 mg KOH/g.

DETAILED DESCRIPTION OF THE EMBODIMENTS

It will be appreciated that certain features of the invention which are, for clarity, described above and below in the context of separate embodiments may also be provided in combination in a single embodiment. Conversely, various features of the invention that are, for brevity, described in the context of a single embodiment may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about". Thus, slight variations above and below the stated ranges can be used to achieve substantially the same results as values within the ranges. Moreover, in the disclosure of these ranges, a continuous range is intended, covering every value between the minimum and maximum values, including the minimum and maximum end points of the range.

The term (meth)acrylic as used here and hereinafter should be taken to mean methacrylic and/or acrylic.

Unless stated otherwise, all molecular weights (both number average molecular weight Mn and weight average molecular weight Mw) referred to herein are determined by GPC (gel permeation chromatographie) using polystyrene as the standard.

Jetness represents the degree of blackness, i.e. the intensity of the coloration of a black surface, achievable with a black pigment. Jetness is the subjective sensory impression when assessing the color deepness of black colourings. Jetness is not a product property, but a system property and depends e.g. on the dispersant binder.

Generally the lower the degree of light refraction and light diffusion, the greater the intensity of the coloration. Color strength is the degree to which black pigments can darken or blacken other coloring constituents. Jetness and color strength tend to increase as the pigment's primary particle size decreases. Different methods for measuring jetness can be used. Usually pigment manufacturers provide their own method.

The copolymer to be used as pigment dispersant according to the invention is water soluble or water dispersible. The copolymer is formed by copolymerization of a mixture of ethylenically unsaturated monomers in the presence of at least one macromonomer having a terminal olefinic unsaturation for the polymerization. The resulting copolymer can be envisioned as being composed of a backbone, formed by the mixture of ethylenically unsaturated monomers, having a plurality of macromonomer "arms" or side chains attached thereto.

The general preparation of copolymers comprising a backbone and macromonomer side chains attached to the backbone is known to a person skilled in the art.

In the present composition the macromonomer side chains and/or the polymeric backbone may have reactive functionalities capable of reacting with a crosslinking agent. But it is preferred to have such reactive functionalities only on the macromonomer side chains.

Preferably the polymeric backbone is hydrophobic in comparison to the macromonomer side chains and preferably the polymeric backbone contains essentially no polymerized ethylenically unsaturated acid containing monomers. The side chains are hydrophilic macromonomers and contain polymerized ethylenically unsaturated acid containing monomers.

To ensure that the macromonomer only has one terminal olefinically unsaturated group which will polymerize with the backbone monomers to form the final copolymer, the macromonomer is polymerized by using a free radical initiator and a catalytic chain transfer agent, in particular a Co (II) or Co (III) chelate chain transfer agent.

Typically, in a first step of the process for preparing the macromonomer, the monomers are blended with an inert organic solvent which is water miscible or water dispersible and a chain transfer agent, preferably a cobalt chain transfer agent, and heated usually to the reflux temperature of the reaction mixture. In subsequent steps additional monomers, the chain transfer agent and conventional polymerization initiator are added and polymerization is continued until a macromonomer is formed of the desired molecular weight.

Suitable cobalt chain transfer agents are described in U.S. Pat. No. 4,680,352 and U.S. Pat. No. 4,722,984. Most preferred are pentacyanocobaltate (II or III), diaquabis(borondifluorodimethyl-glyoximato)cobaltate (II or III) and diaquabis(borondifluorophenylglyoximato)cobaltate (II or III). Typically these chain transfer agents are used at concentrations of about 5-1000 ppm based on the total amount of monomers used.

The macromonomer forming the side chains is preferably formed in a solvent or solvent blend using a free radical initiator and a Co (II or III) chelate chain transfer agent.

Azoinitiators (0.5-5% by weight on total amount of monomers) can be used as free radical initiators in the synthesis of the macromonomers, e.g., 2,2'-azobis(2,4 dimethylpentanenitrile), 2,2'-azobis(2-methylpropanenitrile), 2,2'-azobis(2-methylbutanenitrile), 1,1'-azo(cyclohexane carbonitrile) and 4,4'-azobis(4-cyanopentanoic) acid.

Typical solvents that can be used to form the macromonomer are aromatics, aliphatics, ketones such as methyl ethyl ketone, isobutyl ketone, ethyl amyl ketone, acetone, alcohols such as methanol, ethanol n-butanol isopropanol esters such as ethyl acetate, glycols such as ethylene glycol propylene glycol ethers such as tetrahydrofuran, ethylene glycol mono butyl ether and the like.

After the macromonomer is formed as described above, optionally solvent is stripped off and the backbone monomers are added to the macromonomer along with additional solvent and a free radical initiator. Any of the aforementioned azo type initiators can be used as well as other suitable initiators such as peroxides and hydroperoxides. Typical of such initiators are di-tertiary butyl peroxide, di-cumylperoxide, tertiary amyl peroxide, cumene hydroperoxide, di(n-propyl) peroxydicarbonate, peresters such as amyl peroxyacetate and the like. Polymerization is continued usually at the reflux temperature of the reaction mixture until a graft copolymer is formed of the desired molecular weight.

The copolymer is neutralized with an amine or an inorganic base and then water is usually added to form a dispersion. The copolymer can be neutralized after it has been formed, but before and/or during inversion into the aqueous phase. Preferably the acid group containing macromonomer is already neutralized after it has been prepared and before polymerization with the backbone monomers. The latter avoids internal salt formation with base groups, e.g. amino or imidazole groups, when polymerizing the macromonomer with the backbone monomers. Salt formation can lead e.g. to unwanted increase of viscosity of the final graft copolymer dispersion.

As neutralizing agents for the acid groups inorganic bases including ammonium hydroxide, sodium hydroxide or potassium hydroxide can be used. Typical amines that can be used as neutralizing agents include amino methyl propanol, amino ethyl propanol, dimethyl ethanol amine, triethylamine, dimethylethanolamine, triethanolamine, dimethylaminomethylpropanol and aminomethylpropanol and the like. One preferred amine is amino methyl propanol and the preferred inorganic base is ammonium hydroxide.

The macromonomer (1) is prepared by polymerization of 5-100% by weight of at least one acid functional unsaturated monomer 1a), optionally at least one hydroxy functional unsaturated monomer 1b) and optionally at least one olefinically unsaturated monomer 1c) different from monomers 1a) and 1b), wherein the % by weight of component 1a) are based on the total amount of the macromonomer. Preferably the macromonomer is prepared by polymerization of 10-80% by weight, most preferred 15-60% by weight of component 1a), 0-60% by weight, most preferred 0-40% by weight of component 1b) and 0-90% by weight, most preferred 0-85% by weight of component 1c), wherein the % by weight of components 1a), 1b) and 1c) are based on the total amount of macromonomer (1) and add up to 100% by weight.

Preferably the macromonomer has a weight average molecular weight of about 1,000-20,000, most preferred of 2,000-10,000.

Examples of acid functional unsaturated monomers 1a) are olefinically unsaturated carboxylic acids, phosphonic acids, phosphoric acids and sulfonic acids. Examples of olefinically unsaturated carboxylic acids are acrylic acid, methacrylic acid, crotonic acid and isocrotonic acid. Examples of olefinically unsaturated phosphoric, phosphonic and sulfonic acids are styrene sulfonic acid, acrylamido methyl propane sulfonic acid, methacryloxyethyl phosphate vinyl phosphonic acid and the like. Acrylic and methacrylic acid are preferred with methacrylic acid most preferred.

Examples of suitable hydroxy-functional olefinically unsaturated monomers 1b) are hydroxyalkyl esters of alpha, beta-olefinically unsaturated monocarboxylic acids having primary or secondary hydroxyl groups. Examples include the hydroxyalkyl esters of acrylic acid, methacrylic acid, crotonic acid and/or itaconic acid. The hydroxyalkyl radicals may contain, for example, 1 to 10 carbon atoms, preferably 2 to 6 carbon atoms. Examples of suitable hydroxyalkyl esters of alpha, beta-olefinically unsaturated monocarboxylic acids having primary hydroxyl groups are hydroxyethyl(meth) acrylate, 2,3-hydroxypropyl(meth)acrylate, 2- and 4-hydroxybutyl(meth)acrylate, hydroxyamyl(meth)acrylate, and hydroxyhexyl(meth)acrylate. Examples of suitable hydroxyalkyl esters having secondary hydroxyl groups are 2-hydroxypropyl(meth)acrylate, 2-hydroxybutyl(meth)acrylate, and 3-hydroxybutyl(meth)acrylate.

Further hydroxy-functional unsaturated monomers which may be used are reaction products of alpha, beta-unsaturated monocarboxylic acids with glycidyl esters of saturated monocarboxylic acids branched in the alpha position, e.g., with glycidyl esters of saturated alpha-alkylalkane monocarboxylic acids or alpha, alpha'-dialkylalkane monocarboxylic acids. These are preferably the reaction products of (meth)acrylic acid with glycidyl esters of saturated alpha, alpha'-dialkylalkane monocarboxylic acids having 7 to 13 carbon atoms in the molecule, particularly preferably having 9 to 11 carbon atoms in the molecule. Other hydroxy-functional unsaturated monomers are polyethylene oxide and/or polypropylene oxide modified (meth)acrylates.

Preferably hydroxyalkyl esters of acrylic acid and methacrylic acid are used.

Examples of suitable further olefinically unsaturated monomers 1c) are monomers which may contain apart from an olefinic double bond further functional groups or may contain apart from an olefinic double bond no further functional groups.

Examples of suitable ethylenically unsaturated monomers which contain apart from an olefinic double bond no further functional groups are esters of olefinically unsaturated carboxylic acids. These are esters of olefinically unsaturated carboxylic acids with aliphatic, aromatic and/or cycloaliphatic alcohols. Examples of suitable olefinically unsaturated carboxylic acids include acrylic acid, methacrylic acid, crotonic acid and isocrotonic acid. The alcohols are, in particular, aliphatic monohydric branched or unbranched alcohols having 1-20 carbon atoms in the molecule. Preferred examples are the esters of acrylic and methacrylic acid with aliphatic alcohols, e.g. methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates.

The alcohols may also be aromatic or cycloaliphatic monohydric branched or unbranched alcohols having 1-20 carbon atoms in the molecule. The substituents are, for example, one or more, e.g., up to three alkyl groups, particularly those having 1-4 carbon atoms. Examples of (meth)acrylates with cycloaliphatic alcohols are benzyl acrylate, cyclohexyl acrylate, trimethylcyclohexyl acrylate, 4-tert. butylcyclohexyl acrylate, isobornyl acrylate and the corresponding methacrylates. The aliphatic and cycloaliphatic(meth)acrylates may also be substituted with groups containing heteroatoms, such as halogens and ethers.

Further examples of suitable monomers 1c) are vinyl esters, e.g. vinyl acetate, vinyl propionate, vinyl silanes and vinyl esters of saturated monocarboxylic acids branched in the alpha position, e.g., vinyl esters of saturated alpha,alpha'-dialkylalkane monocarboxylic acids and vinyl esters of saturated alpha-alkylalkane monocarboxylic acids having in each case 5-13 carbon atoms, preferably 9-11 carbon atoms in the molecule.

Examples of suitable further ethylenically unsaturated monomers 1c) which contain apart from an olefinic double bond further functional groups are acetoacetate and silane functional unsaturated monomers, such as acetoacetoxyethyl (meth)acrylate and methacryloxyethyl trialkoxysilanes.

Furthermore it is possible to use monomers having more than 1, e.g. 2 olefinic double bonds in the molecule.

Preferably the macromonomer is essentially free of monomers with base groups, such as amino groups, such as dimethyl amino ethyl methacrylate, diethyl amino ethyl methacrylate and tertiar-butyl amino ethyl methacrylate. This is important to avoid in-situ salt formation during polymerization.

Especially preferred macromonomers are those prepared by polymerization of 5-100% by weight, more preferred 10-80% by weight and most preferred 15-60% by weight of (meth)acrylic acid 1a), 0-80% by weight, more preferred 0-60% by weight and most preferred 0-40% by weight of at least one hydroxy functional (meth)acrylic acid ester 1b) and 0-95% by weight, more preferred 0-90% by weight and most preferred 0-85% by weight of other (meth)acrylic acid esters 1c), different from component 1b), wherein the % by weight of monomers 1a), 1b) and 1c) are based on the total amount of macromonomer (1) and add up to 100% by weight.

Most preferred macromonomers are based on 15-60% by weight of (meth)acrylic acid, 0-40% by weight of at least one hydroxy functional (meth)acrylic acid ester 1b) and 40-80% by weight of other (meth)acrylic acid esters 1c), different from component 1b).

Preferably monomers 1b) and 1c) do not contain amino groups.

Generally mixtures of suitable compatible macromonomers can be used to prepare the (meth)acrylic copolymers. It is also to be understood that the macromonomers referred to as having carboxylic functionality may be part of a mixture of macromonomers of which a portion do not have any carboxylic functionality or variable amounts of carboxylic functionality.

The at least one macromonomer (1) is polymerized with a mixture of olefinically unsaturated monomers (2) to prepare the final copolymer. The mixture of olefinically unsaturated monomers (2) comprises 5-80% by weight of at least one vinyl aromatic monomer 2a), 5-50% by weight of at least one vinyl monomer with at least one polar heterocyclic group with a 5 or 6 membered ring containing at least one nitrogen atom as part of the ring 2b) and optionally at least one further olefinically unsaturated monomer 2c), the % by weight of components 2a), 2b) and 2c) are based on the total amount of the mixture of olefinically unsaturated monomers (2) and add up to 100% by weight.

The mixture of olefinically unsaturated monomers (2) comprises 5-80% by weight, preferably 10-70% by weight and most preferred 20-60% by weight of component 2a), 5-50% by weight, preferably 10-40% by weight and most preferred 15-35% by weight of component 2b), and 0-90% by weight, preferably 10-80% by weight and most preferred 10-65% by weight of component 2c), wherein the % by weight of components 2a), 2b) and 2c) are based on the total amount of the mixture of olefinically unsaturated monomers (2) and add up to 100% by weight.

Examples of vinyl aromatic monomers 2a) are those having 8-12 carbon atoms in the molecule. Preferred examples of such monomers are styrene, alpha-methylstyrene, chlorostyrenes, vinyltoluenes, 2,5-dimethylstyrene, p-methoxystyrene and tertiary-butylstyrene. Most preferred styrene is used as monomer 2a).

Monomer 2b) is used to introduce into the backbone of the copolymer at least one polar heterocyclic group with a 5 or 6 membered ring, containing at least one ring nitrogen atom which is not connected to a hydrogen atom. The polar heterocyclic group may contain more than one nitrogen atom as part of the ring and may also contain a sulfur and/or oxygen atom in the ring. The polar heterocyclic group may be a mononuclear or di-nuclear group, wherein at least one of the rings must be the above defined 5 or 6 membered ring. As used herein, the term "mononuclear" refers to a lone 5 or 6 membered ring, and the term "di-nuclear" refers to a 5 or 6 membered ring fused to another 5 or 6 membered ring. Mononuclear heterocyclic groups are preferred. Preferred heterocyclic groups are triazole, pyrimidine, imidazole, pyridine, morpholine, pyrrolidine, piperazine, piperidine, benzimidazole, benzothiazole and triazine groups. These groups may be unsubstituted or may contain substituents such as, e.g., alkyl, aryl, halogen, and alkoxy groups. Lower alkyl substituted imidazole derivatives are preferred, such as 2-methyl imidazole and 4-methyl imidazole.

Monomer 2b) can be an unsaturated vinyl monomer containing itself the at least one polar heterocyclic group defined above. Suitable vinyl monomers which can be used as monomers 2b) are 1-vinyl imidazole, 2-vinyl pyridine, 4-vinylpyridine, vinyl carbazole and vinyl pyrrolidone.

Monomer 2b) can also be a pre-reacted compound having the at least one polar heterocyclic group defined above. For example, it can be the reaction product of an epoxy functional unsaturated monomer, such as glycidyl(meth)acrylate, with a heterocyclic functional compound which is able to react with the epoxy group. The epoxy group can be reacted for example with a heterocyclic compound having an active hydrogen atom like —NH—, —NH$_2$, —COOH and —SH. Examples of heterocyclic compounds with an active H atom are pyrrolidine, morpholine, piperidine, imidazole, piperazine, 2-mercaptobenzthiazole, 1,2,4-triazole and pyrazole.

The epoxy group can also be reacted with a carboxyl functional heterocyclic derivative to form the pre-reacted unsaturated compound. The monomer 2b) to be used to incorporate into the backbone the polar heterocyclic group defined above shall also include those monomers polymerized in the backbone which are subsequently modified with the polar heterocyclic group defined above. The heterocyclic group can be subsequently incorporated indirectly e.g. through urethane and/or urea linkages. As an example N-(3-aminopropyl)imidazole can be reacted with isophorone diisocyanate on a molar basis to form an intermediate imidazole functional urea with one unreacted isocyanate functional group which in a subsequent step can be reacted with amino groups of a polymerized monomer in the backbone. This amino functional group can be obtained through the copolymerization of e.g. t-butylaminoethyl methacrylate. The isocyanate functional heterocyclic urea intermediate can also be reacted with a hydroxyl group on the backbone to form a urethane linkage. Heterocyclic functional intermediates with an isocyanate functional group may also be formed through reaction of hydroxyl functional heterocyclic derivatives, such as 2-hydroxyethyl morpholine with di- and/or polyisocyanates.

It is preferred to use imidazole groups as polar heterocyclic groups. Especially preferred 1-vinyl imidazole is used as monomer 2b). Using 1-vinyl imidazole as monomer 2b) in the copolymer dispersant gives the best improvement in jetness of the final coating.

The monomers 2b), in particular 1-vinyl imidazole, may be used in combination with other olefinically unsaturated monomers, e.g. in combination with aminofunctional (meth) acrylates, such as dimethyl amino ethyl methacrylate, diethyl amino ethyl methacrylate and tertiar-butyl amino ethyl methacrylate.

Examples of further olefinically unsaturated monomers 2c) are any olefinically unsaturated monomers capable of free-radical polymerization, which are different from monomers 2a) and 2b), but preferably the monomers forming the polymeric backbone do not contain olefinically unsaturated acid containing monomers.

Examples of suitable further ethylenically unsaturated monomers 2c) are monomers which may contain apart from an olefinic double bond further functional groups or may contain apart from an olefinic double bond no further functional groups. All those monomers can here be used as described above as monomers 1c) for forming the macromonomer. Even if not preferred, also hydroxyl-functional monomers as described above as monomers 1b) for forming the macromonomer can be used.

Preferably the mixture of olefinically unsaturated monomers (2) comprises 5-80% by weight, more preferred 10-70% by weight and most preferred 20-60% by weight of styrene (component 2a), 5-50% by weight, more preferred 10-40% by weight and most preferred 15-35% by weight of vinyl imidazole (component 2b), and 0-90% by weight, more preferred 10-80% by weight and most preferred 10-65% by weight of (meth)acrylic acid esters (component 2c), wherein the % by weight of components 2a), 2b) and 2c) are based on the total amount of the mixture of olefinically unsaturated monomers (2) and add up to 100% by weight.

Preferred copolymers are prepared by polymerization of 30-70% by weight of the above defined preferred mixture of olefinically unsaturated monomers (2) with 70-30% by weight of the above defined preferred macromonomer (1), wherein the % by weight are based on the amount of the entire copolymer and add up to 100% by weight.

Most preferred (meth)acrylic copolymers are prepared by polymerization of 30-70% by weight of the above defined most preferred mixture of olefinically unsaturated monomers (2) with 70-30% by weight of the above defined most preferred macromonomers (1), wherein the % by weight are based on the amount of the entire copolymer and add up to 100% by weight.

The pigment dispersion of the present invention comprises an aqueous carrier. The aqueous carrier can be of 100% by weight of water or may contain small amounts of organic solvents.

The pigment dispersion suitably comprises about 2 to 98 percent, preferably 5 to 90%, most preferred 10 to 40%, based on the total weight of the pigment dispersion, of the specified (meth)acrylic copolymer and 30 to 95% by weight, preferred 50 to 90, most preferred 70 to 85 of water. The resulting pigment dispersion has a pigment to dispersant binder weight ratio of about 0.1:100 to 1500:100, preferably of 1:100 to 100:100.

To form the pigment dispersion of the present invention pigments are added to the aqueous copolymer dispersion and then the pigments are dispersed using conventional techniques such as high speed mixing, ball milling, sand grinding, attritor grinding or two or three roll milling. Any of the conventional pigments used in paints in particular waterborne paints can be used to form the pigment dispersion such as metallic oxides like titanium dioxide, iron oxides of various colors, zinc oxide, carbon black, filler pigments such as talc, china clay, barytes, carbonates, silicates and a wide variety of organic pigments such as quinacridones, phthalocyanines, perylenes, azo pigments, indanthrones, isoindolinones, isoindolones, thioindigio reds, benzimidazolinones.

The biggest advantage can be achieved when preparing pigment dispersions with black pigments and using them for the formulation of black colored water-based coating compositions. As black pigments any black pigment can be used, e.g. carbon blacks or organic black pigments, e.g. perylene or azine black pigments. But in particular carbon blacks are used.

Generally the aqueous copolymer dispersions exhibit excellent performance as dispersants for pigments in aqueous media and allow to formulate stabile pigment dispersions and stabile waterborne coating compositions.

It may be desirable to add other optional ingredients to the pigment dispersion such as antioxidants, flow control agents, rheology control agents such as fumed silica, microgels, UV stabilizers, screeners and absorbers.

The aqueous pigment dispersions of this invention can be used for forming waterborne coating compositions. They can be used for forming, for example, waterborne primers, primer surfacers and topcoats. The latter may be monocoats or basecoats of a clear coat base coat finish. In particular the pigment dispersions of the present invention can be used for forming waterborne pigmented monocoat compositions or waterborne basecoat compositions of a clear coat/base coat finish.

Generally the waterborne coating compositions may contain water-reducible binders such as (meth)acrylic copolymers, polyesters and/or polyurethane binders as the film forming constituent and can be formulated as one-component or two-component coating compositions. They may contain crosslinking agents such as blocked or unblocked polyisocyanates, melamines, epoxy resins and the like. Other film forming polymers can also be used such as acrylourethanes and polyethers that are compatible with the pigment dispersion. It is desirable to have the film forming polymer of the coating composition be similar to the copolymer of the pigment dispersion. It is preferred that on curing the copolymer of the pigment dispersion and the film-forming binder will cure with the crosslinking agent, e.g. curing may occur between the hydroxyl groups of the copolymer of the pigment dispersion and the hydroxyl groups of the film-forming binder and the crosslinking agent.

The waterborne coating compositions contain color imparting pigments. These pigments are usually introduced via the pigment dispersion of the present invention. In addition, special effect imparting pigments may be also added separately, if needed. Examples of special effect-imparting pigments are metal pigments, for example made from aluminium, copper or other metals; interference pigments, such as for example metal oxide coated metal pigments, for example titanium dioxide coated or mixed oxide coated aluminium, coated mica, such as for example titanium dioxide coated mica and graphite effect pigments. The waterborne coating compositions also contain water and optionally conventional coating additives and organic solvents. Water-borne base coat compositions or mono-coat compositions preferably contain 50-80 wt. % water, especially preferred 60-75 wt. % water, relative to the complete coating composition.

Suitable pigments are virtually any colour- and/or special effect-imparting pigments, e.g. those already mentioned above and in the description of the pigment dispersion.

The optionally present organic solvents comprise conventional coating solvents. These may originate from the preparation of the binders or may be added separately. Water-miscible solvents are preferred. Examples of suitable solvents are mono- or polyhydric alcohols, for example propanol, butanol, hexanol; glycol ethers or esters, for example diethylene glycol dialkyl ethers, dipropylene glycol dialkyl ethers, in each case with C1 to C6 alkyl, ethoxypropanol, butoxyethanol, glycols, for example ethylene glycol, propylene glycol, N-methylpyrrolidone and ketones, for example methyl ethyl ketone, acetone, cyclohexanone. Examples of conventional coating additives are leveling agents, rheological agents, such as highly disperse silica or polymeric urea compounds, thickeners, such as partially crosslinked polycarboxylic acid or polyurethanes, defoamers, wetting agents, anticratering agents, dispersants and catalysts. The additives are used in conventional amounts known to the person skilled in the art.

Especially preferred the pigment dispersions of the present invention contain black pigments, especially carbon blacks and are used for forming black pigmented water-borne base coat compositions or mono-coat compositions. These black pigmented water-borne base coat compositions or mono-coat compositions result in coatings with excellent color strength and excellent jetness.

Generally jetness tends to increase when flocculation resistance of the black pigment particles, in particular of carbon black particles, increases. Therefore it is assumed that the pigment dispersant of the present invention improves the flocculation resistance in particular of carbon black particles. The pigment dispersion of the present invention, in particular the copolymer pigment dispersant is compatible with a large number of different film-forming binders, which are generally used in waterborne coating compositions. Excellent results in view of stability, color intensity and jetness can be achieved in combination with a number of different binder systems, e.g. with binder systems based on polyurethane, poly(meth)acrylate and/or polyester binders optionally in combination with crosslinkers such as blocked or unblocked polyisocyanates and/or melamine resins.

The waterborne coating compositions of the present invention may be applied in a multilayer coating process in automotive and industrial coating. In particular they may be applied as a base coat layer or mono-coat layer onto an optionally pre-coated substrate. Suitable substrates are metal and plastics substrates, in particular the substrates known in the automotive industry, such as for example iron, zinc, aluminium, magnesium, stainless steel or the alloys thereof, together with polyurethanes, polycarbonates or polyolefins. Any other desired industrial goods from industrial coating processes may however also be coated as substrates.

In the case of automotive or automotive parts coating, the water-borne base coat compositions or the water-borne mono-coat compositions are applied, e.g. by means of spraying, electrostatic spraying, dipping, brushing, flowcoating and the like, onto substrates precoated in conventional manner with primers and/or primer surfacers.

In case of a base coat/clear coat finish the clear coat may be applied onto the base coat layer either after drying or curing or wet-on-wet, optionally after briefly flashing off. Suitable clear coats are, in principle, any known unpigmented or transparently pigmented coating compositions as are, for example, conventional in vehicle coating. They may here comprise single or two-component solvent- or water-based clear coat compositions or clear powder coatings.

The resultant coatings may be cured at room temperature or be forced at higher temperatures, for example of up to 80° C., e.g. at 40 to 60° C. They may, however, also be cured at higher temperatures of for example 80-160° C. Curing temperatures are determined by the field of use as well as the by the type of crosslinker. The same curing temperatures are used in case of mono-coat finishes.

Pigmented waterborne coating compositions prepared by using the pigment dispersions according to the invention yields uniform, high-quality coatings with excellent intensity of color. In particular black pigmented waterborne coating compositions yields coatings with excellent jetness. Surprisingly it has also been found, that waterborne coating compositions containing the pigment dispersions of the present invention show improved repair adhesion performance, when used as a base coat in a clear coat/basecoat finish for repair coating in the line in automotive coating.

The coating compositions according to the invention may be used in the original vehicle production line painting as well as for coating large vehicles and transportation vehicles, such as trucks, busses and railroad cars and in vehicle repair coating. Coating of vehicles may also include coating of vehicle parts.

The following examples are intended to illustrate the invention in greater detail. All parts and percentages are on a weight basis unless otherwise indicated. Molecular weights are determined by Gel Permeation Chromatography using polystyrene as the standard and tetrahydrofuran as the carrier solvent.

EXAMPLES

Example 1

Preparation of Dispersant 1 (with 1-Vinyl Imidazole and Styrene)

1a) Preparation of the Macromonomer

In a reactor equipped with a stirrer, monomer and initiator addition funnels and condenser were heated up to about 80 C. reflux a mixture of 311.79 grams methyl ethyl ketone (MEK) and 0.01 grams of a cobalt chain transfer agent (bis(boron difluorodiphenylglyoximate)cobaltate II). A monomer mixture was prepared based on 223.61 grams Methyl methacrylate (MMA), 120.4 grams of 2-hydroxyethyl methacrylate (HEMA), 86 grams of methacrylic acid (MAA) and 98.47 grams of MEK and added to the monomer addition funnel. Another mixture composed of 91.72 grams MEK 0.05 grams of the cobalt chain transfer agent, 7.74 grams of Vazo 67 (DuPont) was added to the initiator addition funnel. 20% of the monomer mixture was added to the reactor and brought to reflux all under a nitrogen purge followed by a 20% addition of the contents of the initiator funnel. The rest of the monomer mixture was added over 3 hours and this addition was started simultaneously with the addition of the initiator feed over 3 hours 30 minutes and this while keeping reflux in the reactor. Both feed tanks were rinsed with 50.21 grams of MEK and reactor contents held at reflux for another 30 minutes. Finally 10 grams of MEK were added.

Mn/Mw (by GPC): 1500/2800

1b) Preparation of the Final Copolymer

In a reactor equipped with a stirrer, monomer and initiator addition funnels and condenser were heated up to about 90 C. a mixture of 227.83 grams of n-butanol (nBAI), 399.76 grams of macromonomer of example 1a and 29.35 grams of dimethylaminoethyl amine. (DMEA). About 228 grams of MEK were stripped-off and the temperature of the reactor content was brought to about 110 C. A monomer mixture of 96.26 grams Styrene (S), 34.38 grams of n-butyl acrylate (nBA), 41.26 grams of 1-Vinyl imidazole (VIM) and 7.65 grams of nBAI were added to the monomer feed tank. A solution of 5.84 grams of VAZO 67 (DuPont) in 32.89 grams of isopropanol (IPAI) was added to the initiator feed tank and the contents of both feed tanks were added over three hours followed by a rinsing step with 17.21 grams of nBAI. After a hold period of about 30 minutes at reflux, a solution of 19.65 grams VAZO 67 in 76.45 grams of IPAI were added as fast as possible followed by a rinsing step with 7.65 grams of nBAI. The reactor contents were hold at reflux for an additional 1 hour after which the batch was thinned with 38.2 grams of nBAI.

Test Results:
Solids: 47.74%
Viscosity: Y+½
Acid value 77.8
Mn/Mw by GPC 4000/20700

Example 2

Preparation of Dispersant 2 (with 1-Vinyl Imidazole and Styrene)

In a reactor equipped with a stirrer, monomer and initiator addition funnels and condenser were heated up to about 90 C. a mixture of 227.83 grams of n-butanol (nBAI), 399.76 grams of macromonomer of example 1a and 29.35 grams of dimethylaminoethyl amine. (DMEA). About 228 grams of MEK were stripped-off and the temperature of the reactor content was brought to about 110 C. A monomer mixture of 61.88 grams styrene (S), 68.76 grams of n-butyl acrylate (nBA), 41.26 grams of 1-Vinyl imidazole (VIM) and 7.65 grams of nBAI were added to the monomer feed tank. A solution of 5.84 grams of VAZO 67 (DuPont) in 32.89 grams of isopropanol (IPAI) was added to the initiator feed tank and the contents of both feed tanks were added over three hours followed by a rinsing step with 17.21 grams of nBAI. After a hold period of about 30 minutes at reflux, a solution of 19.65 grams VAZO 67 in 76.45 grams of IPAI were added as fast as possible followed by a rinsing step with 7.65 grams of nBAI. The reactor contents were held at reflux for an additional 1 hour after which the batch was thinned with 38.2 grams of nBAI.

Test Results:
Solids: 47.38%
Viscosity: X+½
Acid value 77.7
Mn/Mw by GPC 4200/24100

Comparative Example 1

Preparation of Comparative Dispersant 1 (with t-Amine and Styrene)

In a reactor equipped with a stirrer, monomer and initiator addition funnels and condenser were heated up to about 90 C. a mixture of 227.83 grams of n-butanol (nBAI), 399.76 grams of macromonomer of example 1 and 29.35 grams of dimethylaminoethyl amine. (DMEA). About 228 grams of MEK were stripped-off and the temperature of the reactor content was brought to about 110 C. A monomer mixture of 96.26 grams Styrene (S), 34.38 grams of n-butyl acrylate, 41.26 grams of dimethylaminoethyl acrylate (DMAEA) and 7.65 grams of nBAI were added to the monomer feed tank. A solution of 5.84 grams of VAZO 67 (DuPont) in 32.89 grams of isopropanol (IPAI) was added to the initiator feed tank and the contents of both feed tanks were added over three hours followed by a rinsing step with 17.21 grams of nBAI. After a hold period of about 30 minutes at reflux, a solution of 19.65 grams VAZO 67 in 76.45 grams of IPAI were added as fast as possible followed by a rinsing step with 7.65 grams of nBAI. The reactor contents were hold at reflux for an additional 1 hour after which the batch was thinned with 38.2 grams of nBAI.

Test Results:
Solids: 51.3%
Viscosity: Z2+¼
Acid value 68.2
Mn/Mw by GPC 4300/18400

Preparation of Pigment Dispersions

Carbon black pigment dispersions 1 (with dispersant 1) and 2 (with dispersant 2) according to the invention and comparative carbon black pigment dispersion 1 (with comparative dispersant 1) were prepared using the following ingredients, with the only difference being the type of dispersant.

The dispersions contain the following ingredients (% by weight):

| | |
|---|---|
| Deionized water | 67.9 |
| AMP-95 (2-amino-2-methyl-1-propanol from Angus Chem Co.) | 1.8 |
| Defoamer (Surfynol 104 DPM from Air Products & Chemicals) | 0.3 |
| Dispersant 1 | 20.0 |
| (Dispersant 2 | 20.0) |
| (Comparative dispersant 1 | 20.0) |
| Carbon black pigment (Raven 5000 Ultra II from Columbian Chemicals) | 10.0 |

The dispersions had a solids content of 18.5% and a dispersant to pigment ratio of 85/100.

Preparation of Coating Compositions 11800 g each (3 gallon) premixes were prepared using a High Speed Disperser for 1 hour. Then, these premixes were processed through a mill (2.0 Liter LMZ (liegende muhle zeta) mill from Netzsch, Inc. Exton, Pa.). Processing parameters are as follows: 85% media, 2250 RPM rotor speed, and 525 gram per minute product flow rate, 240 minutes grind time. Every 30 minutes dispersion sample was taken for jetness evaluation.

Coating compositions 1 (with pigment dispersion 1) and 2 (with pigment dispersion 2) and comparative coating composition 1 (with comparative pigment dispersion 1) were prepared using the following ingredients, with the only difference being the type of pigment dispersion. The coating compositions contain the following ingredients (in g):

| | |
|---|---|
| Rheology control additive (2.1% dispersion of Laponite RD 28.7 synthetic clay from Rockwood Additives in de-ionised water) | 28.6 |
| Acrylic latex according to example 1 of EP 038 127 (30.0% solids in an aqueous medium, copolymer of methyl methacrylate, allyl methacrylate, butyl acrylate, hydroxy ethyl acrylate, methacrylic acid Water (deionized) | 15.3 |
| Polyurethane resin (Sanprene UX-5100 from Sanyo Chemical Industries) | 5.8 |
| Ethylene glycol monobutyl ether | 5.9 |
| 2-hexylene glycol monobutylehter | 1.1 |
| Heavy naphtha (Isopar H Solvent from ExxonMobil Chemical Co.) | 3.1 |
| Surfynol 104 (defoamer from Air products) | 0.7 |
| Cymel 301 (melamine resin from Cytec Industries) | 5.0 |
| Tinuvin 384-2 (Light Stabilizer from Ciba) | 0.2 |
| Solution of Nacure XP-221 (40.8%, aromatic sulfonic acid from King Industries) | 0.8 |
| Self-emulsifiable Polyester (80% solids in butyl glycol, prepared from 26% adipic acid, 29% isophthalic acid, 35% neopentylglycol, 10% trimethylol propane) Pigment Dispersion 1 | 4.8 30.0 |
| (Pigment Dispersion 2 | 30.0) |
| (Comparative pigment dispersion 1 | 30.0) |
| Total | 130.0 |

The coating compositions 1 and 2 and comparative coating composition 1 have been applied by spraying in a dry film thickness of 20 μm onto metal panels precoated with automotive electro coat and solvent borne primer.

After two minutes ambient flash, followed by five minutes drying at 80° C. usual commercial one component acrylic-silane-melamine clearcoats (DuPont Gen® IVesw Clear) have been applied. Final coating composition has been allowed ambient flash and then been baked at 140° C. for 30 minutes.

Each of the panels was measured for jetness. The method for measuring jetness provided by Degussa has been used. A full description of the method can be found in "Coloristic Measurements of Jet-Black and Grey Coatings," Technical Bulletin on Pigments, No. 37, 1994.

Jetness is a color measurement for black films. The Jetness No. is a function of L, a and b values measured at a 10 degree angle using a standard spectrophotometer and the Jetness No. is calculated using the equations in the above publication. The Jetness No. increases with decreasing L, a and b values. Therefore, a desirable black basecoat with darker bluer color and less redness has a higher Jetness number.

The Jetness number for each of the samples is shown below.

Coating composition 1: 314.5
Coating composition 2: 313.4
Comparative coating composition 1: 309.4

The above results show that coating compositions prepared with the black pigment dispersions according to the invention show a better jetness (about 4-5 units better) than the coating composition prepared with the comparative black pigment dispersion.

Additionally waterborne basecoats prepared with the black pigment dispersions according to the invention show superior repair adhesion performance. Test panels were prepared to simulate automotive OEM coating systems, namely cold rolled steel with phosphate treatment, electrocoat deposition, and solventborne automotive primer were coated with the basecoat compositions described above. Panels were flash dried at ambient conditions for five minutes and then at 80° C. for five minutes. They were then sprayed with Gen® IVesw clearcoat (DuPont), allowed to flash dry at ambient conditions, then baked for 30 minutes at 140° C. The basecoat and clearcoat operation was repeated to simulate an automotive OEM repair.

Cross-hatch adhesion tests (according to DIN ISO 2409, or ASTM D3359) were performed on the coated panels. Panels were then exposed to 100% condensing humidity at 43° C. for 96 hours. Cross-hatch adhesion was re-tested.

| | Dry Adhesion | post-Humidity Adhesion |
|---|---|---|
| Coating composition 1: | pass | pass |
| Coating composition 2: | pass | pass |
| Comparative coating composition 1: | fail | fail |

Test results show that overall adhesion has been improved when using the dispersions according to the invention.

What we claim is:

1. Aqueous pigment dispersion comprising at least one dispersed carbon black pigment, an aqueous carrier and at least one copolymer, said copolymer is prepared by polymerization of 10-90% by weight of at least one macromonomer (1) having a terminal olefinic unsaturation in the presence of cobalt chain transfer agent, and 90-10% by weight of a mixture of olefinically unsaturated monomers (2), wherein the % by weight are based on the total amount of the copolymer and add up to 100% by weight, and wherein the at least one macromonomer (1) comprises 1a) 5-100% by weight of at least one polymerized acid functional unsaturated monomer,
1b) optionally at least one polymerized hydroxy functional unsaturated monomer,
1c) and optionally at least one polymerized olefinically unsaturated monomer different from monomers 1a) and 1b), and wherein
the mixture of olefinically unsaturated monomers (2) comprises 2a) 5-80% by weight of at least one unsaturated vinyl aromatic monomer,
2b) 5-50% by weight of at least one vinyl monomer with at least one polar heterocyclic group with a 5 or 6 membered ring, containing at least one ring nitrogen atom which is not connected to a hydrogen atom,
2c) and optionally at least one olefinically unsaturated monomer different from monomers 2a) and 2b),
wherein the % by weight of component 1a) are based on the total amount of macromonomer (1) and the % by weight of components 2a, 2b and 2c are based on the total amount of the mixture of olefinically unsaturated monomers (2) and add up to 100% by weight.

2. Aqueous pigment dispersion of claim 1, wherein the copolymer has a weight average molecular weight Mw of 3,000 to 100,000.

3. Aqueous pigment dispersion of claim 1, wherein the copolymer has a weight average molecular weight Mw of 5,000 to 70,000.

4. Aqueous pigment dispersion of claim 1, wherein the copolymer comprises 20-80% by weight of the at least one macromonomer (1) and 80-20% by weight of the mixture of olefinically unsaturated monomers (2).

5. Aqueous pigment dispersion of claim 1, wherein the copolymer comprises 30-70% by weight of the at least one macromonomer (1) and 70-30% by weight of the mixture of olefinically unsaturated monomers (2).

6. Aqueous pigment dispersion of claim 1, wherein the macromonomer (1) comprises
1a) 10-80% by weight of at least one polymerized acid functional unsaturated monomer,
1b) 0-60% by weight of at least one polymerized hydroxy functional unsaturated monomer, and
1c) 0-90% by weight of at least one polymerized olefinically unsaturated monomer different from monomers 1a) and 1b), wherein the % by weight of components 1a), 1b) and 1c) are based on the total amount of macromonomer (1) that add up to 100% by weight.

7. Aqueous pigment dispersion of claim 1, wherein component 1a) is (meth)acrylic acid, component 1b) is at least one hydroxy functional (meth)acrylic acid ester, and component 1c) is at least one (meth)acrylic acid ester different from component 1b).

8. Aqueous pigment dispersion of claim 1, wherein the mixture of olefinically unsaturated monomers (2) comprises
2a) 10-70% by weight of at least one unsaturated vinyl aromatic monomer,
2b) 10-40% by weight of at least one vinyl monomer with at least one polar heterocyclic group with a 5 or 6 membered ring containing at least one nitrogen atom as part of the ring, and
2c) 10-80% by weight of at least one olefinically unsaturated monomer different from monomers 2a) and 2b), wherein the % by weight of components 2a), 2b) and 2c) are based on the total amount of the mixture of olefinically unsaturated monomers (2) that add up to 100% by weight.

9. Aqueous pigment dispersion of claim 1, wherein component 2a) is styrene, component 2b) is 1-vinyl-imidazole and component 2c) is at least one olefinically unsaturated monomer different from components 2a) and 2b).

10. Waterborne coating composition comprising the aqueous pigment dispersion of claim 1.

11. Waterborne coating composition of claim 10 comprising at least one binder selected from a group consisting of polyurethane, polyester, poly(meth)acrylate and combinations thereof.

12. Waterborne coating composition of claim 10 comprising at least one crosslinking agent selected from a group consisting of blocked polyisocyanate, unblocked polyisocyanate, melamine resin and combinations thereof.

13. A vehicle coating comprising the waterborne composition of claim 10.

* * * * *